United States Patent [19]

Kisor

[11] Patent Number: 5,809,250

[45] Date of Patent: Sep. 15, 1998

[54] METHODS FOR CREATING AND SHARING REPLAYABLE MODULES REPRESENTIVE OF WEB BROWSING SESSION

[75] Inventor: Gregory Hurst Kisor, Beaverton, Oreg.

[73] Assignee: Intel Corporation, Santa Clara, Calif.

[21] Appl. No.: 735,887

[22] Filed: Oct. 23, 1996

[51] Int. Cl.[6] ....................................................... G06F 13/00
[52] U.S. Cl. ................................ 395/200.57; 395/200.54
[58] Field of Search ......................... 395/200.03, 200.09, 395/200.11, 200.12, 610, 615, 618, 182.02, 182.18, 184.01, 200.31, 200.47, 200.54, 200.57, 200.58; 707/10, 202

[56] References Cited

U.S. PATENT DOCUMENTS

| | | | |
|---|---|---|---|
| 5,065,311 | 11/1991 | Masai et al. | 395/182.18 |
| 5,086,386 | 2/1992 | Islam | 707/202 |
| 5,303,166 | 4/1994 | Amalfiltano et al. | 364/551.01 |
| 5,371,889 | 12/1994 | Klein | 395/676 |
| 5,537,542 | 7/1996 | Eilert et al. | 395/200.31 |
| 5,544,303 | 8/1996 | Maroteaux et al. | 345/326 |
| 5,619,648 | 4/1997 | Canale et al. | 395/200.36 |
| 5,708,780 | 1/1998 | Levergood et al. | 395/200.59 |
| 5,712,979 | 1/1998 | Graber et al. | 395/200.54 |

OTHER PUBLICATIONS

Tim Greene, "Sahara puts Java to management test", NetworkWord Feb. 12, 1996, vol. 13, No. 7, pp. 1 and 72.

*Primary Examiner*—Parshotam S. Lall
*Assistant Examiner*—Viet Vu
*Attorney, Agent, or Firm*—Raymond Werner

[57] ABSTRACT

A program that can be launched during a browsing session logs protocol calls and stores time-stamped copies of those calls to a call list file. Calls that result in errors returned from the remote server or proxy are flagged, and may optionally be retained, or automatically or manually deleted. The program also creates a map file so as to keep information needed to associate a protocol call to the file or files downloaded in response to the protocol call. Filtering and tagging of downloaded files can optionally be performed to assist in the manual or automatic determination of whether to include the downloaded file(s) in a session file. Entries in the session file may be annotated with text, audio, video or various combinations of these and other media. The session file can be communicated to one or more users remote temporally, geographically, or both. The session file provides protocol calls to a user's local browser thus replaying the recorded browsing session as edited or annotated.

34 Claims, 6 Drawing Sheets

METHODS FOR CREATING AND SHARING REPLAYABLE MODULES REPRESENTIVE OF WEB BROWSING SESSION

BACKGROUND OF THE INVENTION

1. Field of the Invention

The present invention relates generally to social computing, and more particularly to a method of capturing, editing and sharing a World Wide Web browsing session.

2. Background

World Wide Web browsers such as Netscape Navigator and Internet Explorer have mechanisms that cache web content to memory when it has been retrieved. It is possible to save a web page that has been retrieved as a hyper text mark up language (HTML) file complete with embedded images through the use of an explicit save or edit command. During a session it is possible to go explicitly to a page that has been previously visited. However, the entire session cannot currently be saved and replayed at a later time or shared with a friend. It is also not possible to annotate or store personal comments about a page or set of pages that have been visited.

What is needed is a method that captures a web browsing session for replay at a later time. What is further needed is a method of editing and a method of annotating a captured web browsing session.

SUMMARY OF THE INVENTION

In accordance with the method of the present invention, a software program is launched during a web browsing session. This program logs time stamped copies of protocol calls and stores those calls to a call list file. Calls that result in errors returned from the remote server or proxy are flagged, and may optionally be retained, or automatically or manually deleted. The program also creates a map file so as to keep information needed to associate a protocol call to the file or files downloaded in response to the protocol call. The program optionally stores to the session file, either retrieved binary files or the commands used to retrieve the binary files. Entries in the session file may be annotated with text, graphics, audio, video or various combinations of these and other media. The session file can be communicated to one or more users that are remote temporally, geographically, or both. The session file provides protocol calls to a user's local browser thus replaying the recorded browsing session as edited or annotated.

In an alternative embodiment a filter function is performed on information returned in response to a protocol call. More particularly, information returned in response to a protocol call is compared to one or more user defined criteria, and one or more filter flags indicative of the results of the comparison are generated and written to the call list file. These flags can be used in a way similar to the error flags, such that the information returned may optionally be retained, reordered according to a weighting algorithm, or automatically or manually deleted.

Social computing is facilitated because the web session, either in its original form, or with the annotational enhancements, can be shared by other users who are remote geographically, temporally, or both.

DETAILED DESCRIPTION

Terminology

Browser refers to a program which allows a user to read HTML files and information embedded in hypertext links in these files. The browser gives some means of viewing the contents of local and remote files and of navigating from one file to another using embedded hypertext links. Browsers act as clients to remote web servers. Netscape Navigator (Netscape Communications Corp., www.netscape.com) and Internet Explorer (Microsoft Corporation, www.microsoft.com) are examples of browsers for the World Wide Web. Browsers are sometimes referred to as web browsers.

Click refers to the user action of pressing a button on a mouse or other pointing device. This typically generates an event, also specifying the screen position of the cursor, which is then processed by a window manager or application program.

HTML (also html) refers to a hypertext document format used on the World wide Web. "Tags" are embedded in the text. A tag consists of a "<", a "directive", zero or more parameters and a ">". Matched pairs of directives, like "<title>" and "</title>" are used to delimit text which is to appear in a special place or style.

Hyperlink refers to a reference (link) from some point in one hypertext document to (some point in) another document or another place in the same document. A browser usually displays a hyperlink in some distinguishing way, e.g. in a different color, font or style. When a user activates the link (e.g., by clicking on it with the mouse) the browser will display the target of the link.

Hypertext refers to a collection of documents containing cross-references or "links" which, with the aid of an interactive browser program, allow the reader to move easily from one document to another.

HTTP (also http) refers to the client-server TCP/IP protocol used on the World Wide Web for the exchange of HTML documents.

Mouse refers to a common kind of input device connected to a computer system, also known as a pointing device. A mouse is moved over a flat horizontal surface and includes some means of converting its position in two dimensions into X-Y coordinates which the computer can read. The mouse has one or more buttons whose state can also be read by the computer to which it is attached. It is called a mouse because the wire connecting it to the computer or keyboard looks like a mouse's tail. Trackballs and joysticks are input devices with similar functionality. Wireless pointing devices that communicate with a computer by, for example, infrared signaling, are also available and provide functionality substantially similar to that of the mouse.

Operating system refers generally to the low-level software which schedules tasks, allocates storage, handles the interface to peripheral hardware and presents a default interface to the user when no application program is running.

Plug-in refers to a file containing data used to alter, enhance, or extend the operation of a parent application program. For example, the Netscape Navigator World-Wide Web browser supports plug-ins. A plug-in is specific to a particular operating system and displays or interprets a particular file format such as Shockwave, RealAudio, Adobe PDF, or Corel CMX. The file to be displayed is included in a web page using an <EMBED ...> HTML tag.

Proxy gateway refers to a computer and associated software which will pass on a request for a URL from a World Wide Web browser to an outside server and return the results. This provides a trusted agent that can access the Internet on behalf of clients that are sealed off from the Internet. The client's user is typically not aware of the proxy gateway.

Proxy server refers to a World Wide Web server which accepts URLs with a special prefix. When it receives a request for such a URL, it strips off the prefix and looks for the resulting URL in its local cache. If found, it returns the document immediately, otherwise it fetches it from the remote server, saves a copy in the cache and returns it to the requester. The cache will usually have an expiry algorithm which flushes documents according to their age, size, and access history.

URL (Uniform Resource Locator) refers to a draft standard for specifying an object on the Internet, such as a file or newsgroup. URLs are used extensively on the World Wide Web. They are used in HTML documents to specify the target of a hyperlink. Background information on URLs may be obtained from "http://www.w3.org/pub/WWW/Addressing/Addressing.html".

Web page refers to a block of data available on the World-Wide Web, and identified by a URL. Each web page is usually stored on a server as a file written in HTML, possibly referring to images which appear as part of the page when it is displayed by a browser. A web page can also refer to other web pages and Internet resources by including hypertext links. Each user at a web site usually has their own home page. To "go to" a page actually means to receive the information necessary to display a page.

Web server refers to a server process running at a web site which sends out web pages in response to HTTP requests from remote browsers.

Web site refers to any computer on the Internet running a World Wide Web server process. A particular web site is identified by the hostname part of a URL.

World Wide Web refers to an Internet client-server hypertext distributed information retrieval system which originated from the CERN High-Energy Physics laboratories in Geneva, Switzerland. The client program is known as a browser and runs on the user's computer. Documents represented as hypertext objects in HTML format are presented to the user in a graphical format by the browser. Hypertext links refer to other documents by their URLs. These can refer to local or remote resources accessible via FTP, Gopher, Telnet or news, as well as those available via the http protocol used to transfer hypertext documents. The World Wide Web is alternatively referred to as WWW, W3, or the Web.

Some portions of the detailed descriptions which follow are presented in terms of algorithms and symbolic representations of operations on data bits within a computer system. These algorithmic descriptions and representations are the means used by those skilled in the data processing arts to most effectively convey the substance of their work to other skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

General Architecture

Figure 1A:
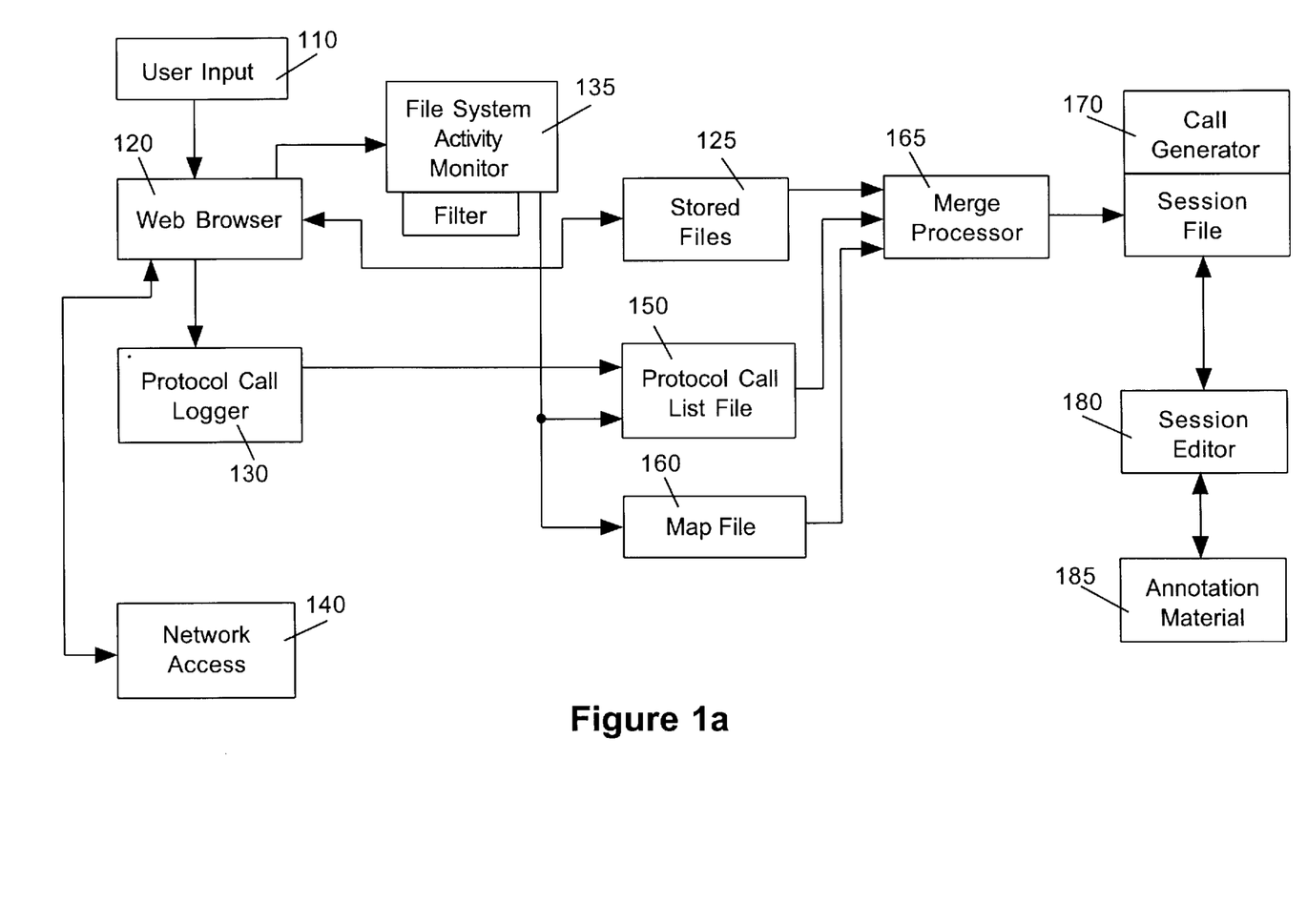
FIG. 1(a) is a block diagram showing the general architecture of the present invention.

Referring to FIG. 1(a), a general architecture for the present invention is described. As discussed more fully below, some portions of FIG. 1(a) represent information processing blocks, typically implemented as program code, and other portions represent data. Typically, the present invention is used in conjunction with a personal computer (PC).

A user provided input 110, is received and processed by a web browser 120. Web browser 120 may access stored files 125 in the process of creating a graphical presentation to the user of a hypertext object. Stored files 125 may be cached on the users local PC or on a proxy server. Those skilled in the art will recognize that although graphical presentations are most common, any means of communicating information may be used to present a hypertext object to a user.

Web browser 120 typically passes a protocol call, such as a URL call, to a network access processor 140. In accordance with the present invention, a protocol call logger 130 directs a copy of the protocol call, along with a time and date stamp be placed in a protocol call list file 150.

Files retrieved in response to the protocol calls may be stored locally, typically as binary files. A file system activity monitor 135 keeps track of which, if any, downloaded files are stored, together with the filenames of the stored files. A map file 160 is created by file system activity monitor 135. Map file 160 contains the information needed to associate the filenames of the stored files to the protocol call which resulted in the downloading of these files.

A merge processor 165 combines information from stored files 125, protocol call list file 150, and map file 160, to produce a session file 170. Session file 170 contains the information necessary to replay the browsing session. That is, session file 170 specifies how to replay the browsing session. A session editor 180 is used to modify session file 170. Modifications of session file 170 include, but are not limited to, changing the information regarding protocol calls, changing the amount of time a web page is to be displayed, and adding instructions to display annotational information in conjunction with the display of the web page. Those skilled in the art will understand that "display" can include the communication of text, graphics, video data, or the like, to a visually perceivable output device, as well as the communication of audio information to output devices that produce aurally perceivable output. In accordance with the present invention, annotational information can be any information in any form that can be communicated to the user. Annotational material 185 may be supplied by direct user input, or by files stored prior to editing session file 170, or a combination of both.

Session file 170 may include the code necessary to generate protocol calls from the information stored within the rest of session file 170. Alternatively, a browser program may be equipped ahead of time with the appropriate plug-in modules to read and process session file 170.

Figure 1B:
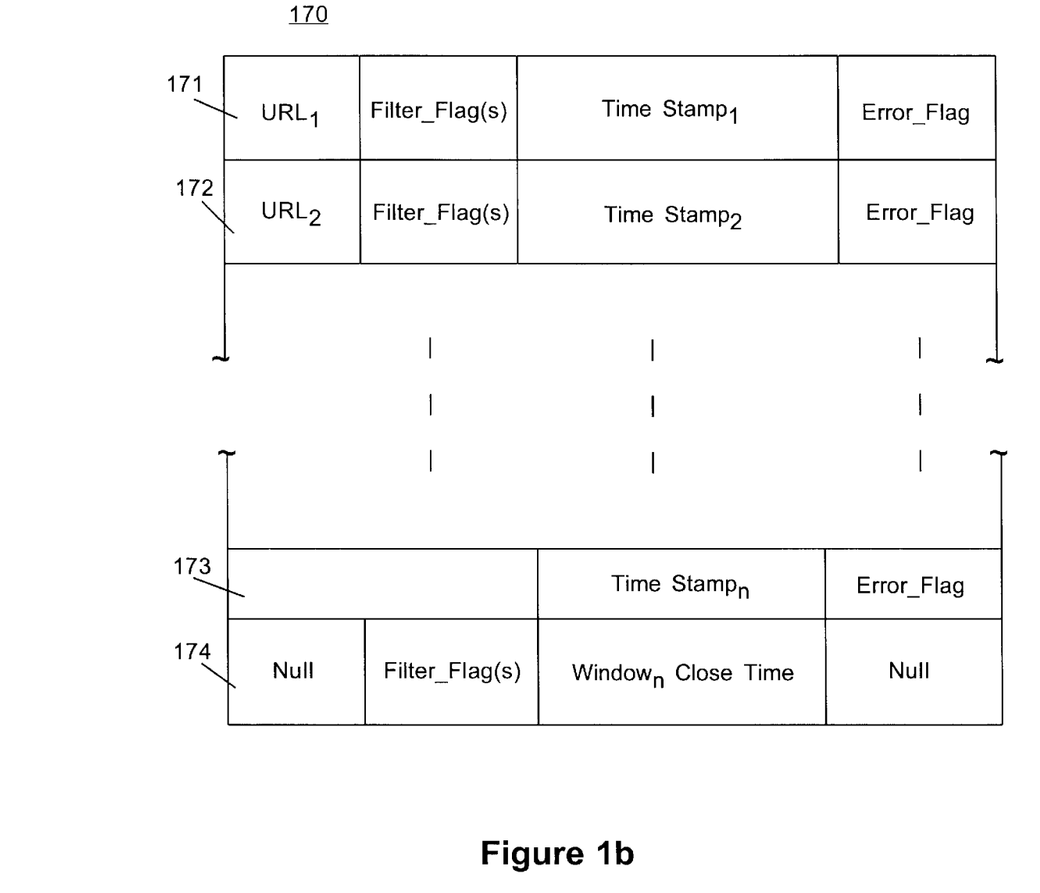
FIG. 1(b) shows a data structure format for the protocol call list file.

An illustrative data structure for protocol call list file 150 is described with reference to FIG. 1(*b*). Records 171, 172, 173 each contain a protocol call field, a filter flag field, an associated time stamp field, and an error_flag field. Record 174 contains a null character in the protocol call field, a special time stamp indicating the window close time of the last displayed web page, and a null character in the error_flag field. The window close time stamp may alternatively be set to approximately the time at which the user enters a "stop recording" command. It will be understood that the order of the fields can be selected arbitrarily, or in a specific order if the hardware and operating system of the implementation platform provides an advantage to such a specific order. In alternative embodiments of the present invention, inclusion of either the filter flag field, the error flag field, or both is optional.

Figure 1C:
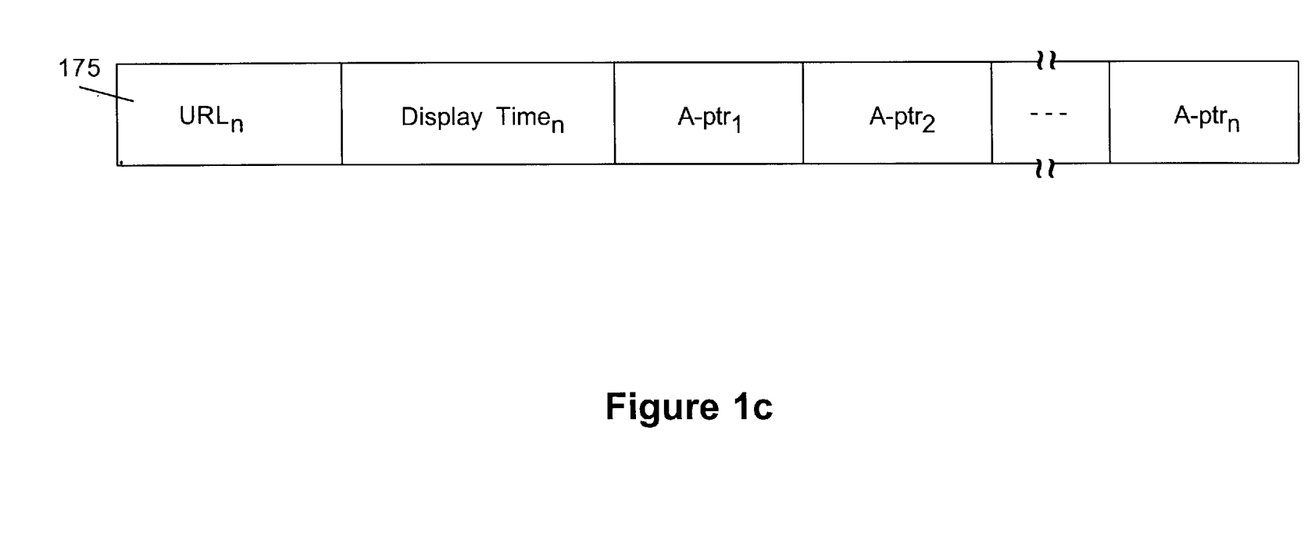
FIG. 1(c) shows a data structure format for a first type of session file record.

An illustrative record format for session file 170 is described with reference to FIG. 1(*c*). Record 175 contains a protocol call field, a display time field, and one or more pointers to annotation material. The protocol call field typically contains a URL. The annotation material may be text, graphics, audio, video, or any other medium for communicating information to a user, or some combination of the various media. Annotation material may also be instructions to concurrently run one or more additional browsers along with protocol calls to be issued by those browsers. Typically, the annotation material is stored in one or more files. Alternatively, annotation material may be directly incorporated into session file 170, rather than pointers to the annotation material. Since a session file typically contains a plurality of protocol calls, each representative of associated pages, there are therefore typically a plurality of blocks of annotation material (or annotation pointers), each block also associated with those specific pages.

The display time field contains the information regarding the amount of time that a particular page should be displayed. The display time is computed by determining the difference between two consecutive time stamps in protocol call list file 150. Generally, the $i^{th}$ display time equals the $i+1^{th}$ time stamp minus the $i^{th}$ time stamp. For example, the values for the display time fields for each of the URLs shown in FIG. 1(*b*) would be determined as follows:

display_time_1=time_stamp_2−time_stamp_1;

display_time_2=time_stamp_3−time_stamp_2; and display_time_*n*=window_close_time−time_stamp_*n*

Recording a browsing session

Figure 2:
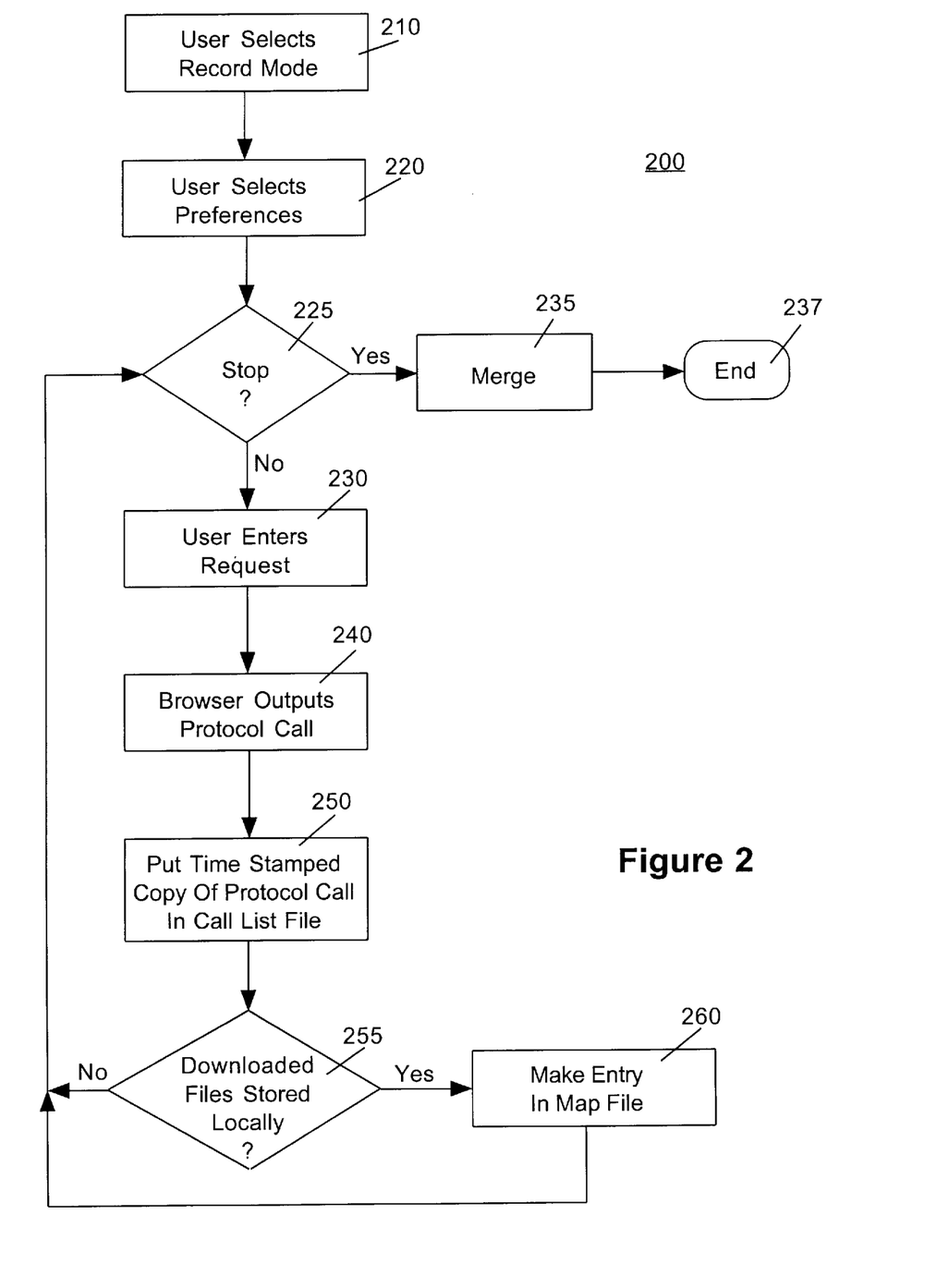
FIG. 2 is a flowchart showing the operation of the web browsing session recording process.

Referring to FIG. 2, a process 200 for recording a browsing session is described.

In a step 210 the user selects record mode. This selection enables the recordation of protocol calls, such as URL calls in a file. An alternative term for recordation in this context is logging.

In a step 220 the user selects various options to be used during the recording process. These options are sometimes referred to as preferences or features. For example, when a protocol call results in an error being returned, a user selected option can determine whether the errors are to be recorded, automatically deleted, or the user prompted for real time input as to whether to keep or discard the error page. Another example of a user selectable option is the value of a received-page-threshold at which a timer is to start, or a time stamp is to be applied. Timer and time stamp details are provided below. The aggregation of selected features is sometimes referred to as the configuration, and the step of selecting is sometimes referred to as configuring. Alternatively, the configuration process can be done prior to initiating the recording of a browsing session. A still further alternative is to provide the recording process with a default configuration, so that a user does not need to enter configuration data.

In a step 225 determination is a made as to whether a command to stop recording has been entered. If the stop command has not been entered then in a step 230 the user enters a request for a file or a web page. This is typically done by clicking on a hyperlink, but can also be done by expressly entering a URL. The recording process then continues with step 240, as described below.

If a determination is made in step 225 that a stop command has been entered, then in a step 235 the contents of protocol call file 150 and the contents of map file 160 are used by merge processor 165 to synthesize session file 170. Merge processor 165 can be activated either by a specific user command, or by terminating the browsing session. If a user chooses to activate the merge process prior to ending the browsing session, then the user may optionally elect to continue the recording process so as to either append further recordation to the existing session file or to direct further recordation to a new session file. Subsequently, in a step 237 the recording of the browsing session is terminated.

In a step 240 the browser outputs a protocol call, typically a URL call.

In a step 250 the protocol call logger places a time stamped copy of the protocol call in the call list file.

In a step 255 a determination is made as to whether one or more files have been downloaded in response to a protocol call. If no downloaded files have been stored locally, then the browsing session continues with the user entering additional commands or requests. The information typically returned in response to a protocol call is a web page. A more general expression for this information is a requested page, since web page typically refers to html format files, while the present invention is not limited to html format files or browsers.

If a downloaded file has been stored locally then, in a step 260 an entry is made in map file 160 to indicate files which have been received and stored in response to user requests. Since a user may rename a file when it is stored locally, it is useful to provide this mapping function to facilitate later recall of the stored files.

In an alternative embodiment a filter function is performed on information returned, that is downloaded, in response to a protocol call. This downloaded, information is compared to one or more user defined criteria. One or more filter flags indicative of the results of the comparison are generated and written to the call list file. These flags represent the output of the filter function, and can be used in a way similar to the error flags. The information returned may optionally be retained, reordered according to a weighting algorithm, or automatically or manually deleted. The filtering function can act as an information bandpass filter in which downloaded information is identified as information that is to be accepted by merge processor 165 for inclusion in session file 170. Alternatively this can be viewed as an information bandstop filter in which downloaded information is identified as information that is to be rejected by merger processor 165. The filtering process can be simple or complex; it can be defined by a user; or pre-determined and installed as a plug-in. Filtering can be done based on any suitable criteria, for example, but not limited to, the source of the information, the length of the information, the date of the information, the content of the information, and so on.

The time stamp, mentioned above, can be set to be approximately the time of the protocol call, or approximately when the requested page is partially received and displayed, or approximately when the requested page is fully received and displayed. As to setting the time to be approximately when the requested page is partially received and displayed, a user selectable threshold can be set. For example, the threshold can be set to be when the requested page is 85% complete. Those skilled in the art will understand that a page may be fully received and yet not fully displayed due to limitations associated with the user's display device, or choice of window display size.

In a step 235 the contents of protocol call file 150 and the contents of map file 160 are used by merge processor 165 to synthesize session file 170. Merge processor 165 can be activated either by a specific user command, or by terminating the browsing session. If a user chooses to activate the merge process prior to ending the browsing session, then the user may optionally elect to continue the recording process so as to either append further recordation to the existing session file or to direct further recordation to a new session file.

Editing a recorded browsing session

Figure 3:
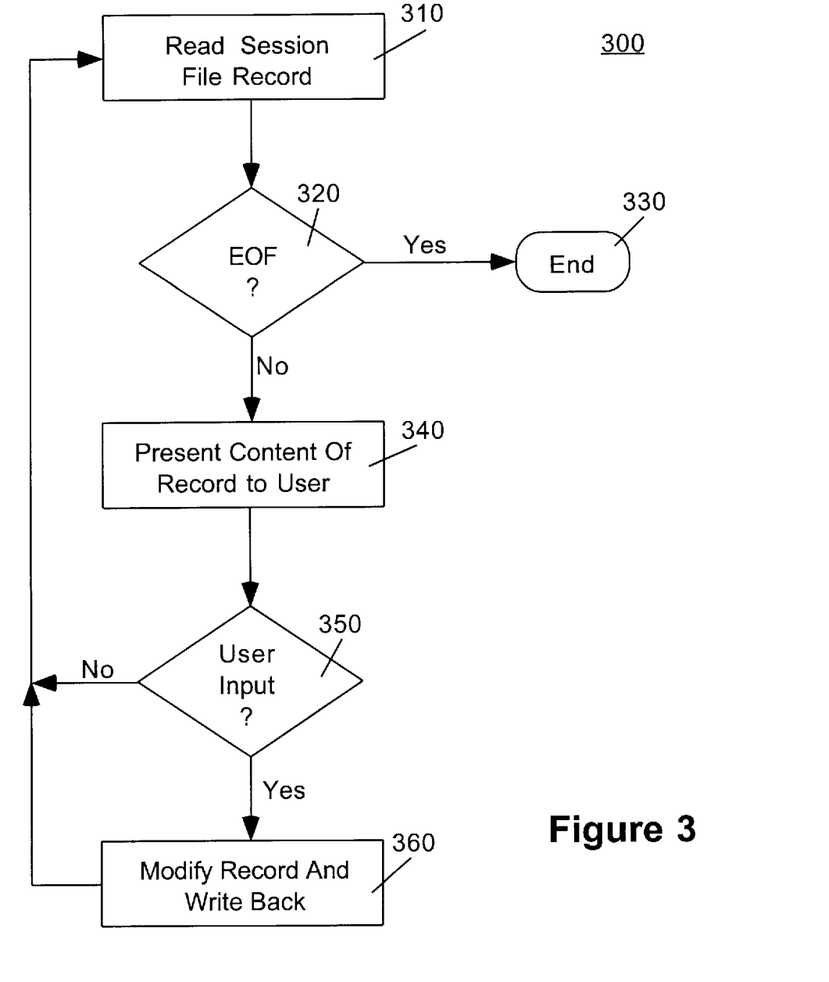
FIG. 3 is a flowchart showing the operation of the session editor.

Referring to FIG. 3, a process 300 for editing a web browsing session is described.

Session editor 180 is a tool for modifying the session file. Modifications of session file 170 include, but are not limited to, changing the information regarding protocol calls, changing the amount of time a web page is to be displayed, and adding instructions to display annotational information in conjunction with the display of a web page, html file, or other object. In an alternative embodiment session editor 180 also determines if annotation material, for example an audio or video clip, takes longer to play back than the display time associated with a particular protocol call, by comparing the display time field in the session file with a play back time field associated with the annotation material. If the annotation material play back time is greater than the display time set in the session file, than session editor 180 substitutes the greater value for the lesser value. In this way the presentation of the annotation material is not cut short.

In a step 310 a record is read from session file 170. In a step 320 a determination is made as to whether the end of session file 170 has been reached. If the end of session file 170 has been reached then in a step 330, editing process 300 terminates.

If the end of session file has not been reached then in a step 340, the contents of the record are presented to the user. Typically this is accomplished by means of a graphical user interface.

In a step 350 a determination is made as whether the user is providing instruction to annotate session file 170. If no annotation is to be made to the current record then control returns to step 310 to read another record from session file 170. Typically the next sequential record would be read. If it is determined in step 350 that the record is to be annotated, then in a step 360 the record is modified and written back to session file 170. Control the returns to step 310.

Those skilled in the art will understand that reading records from files and writing records to files are common, well-known tasks, in computer programming, the specifics of which vary from one operating system to another.

Playback of a browsing session

Figure 4:
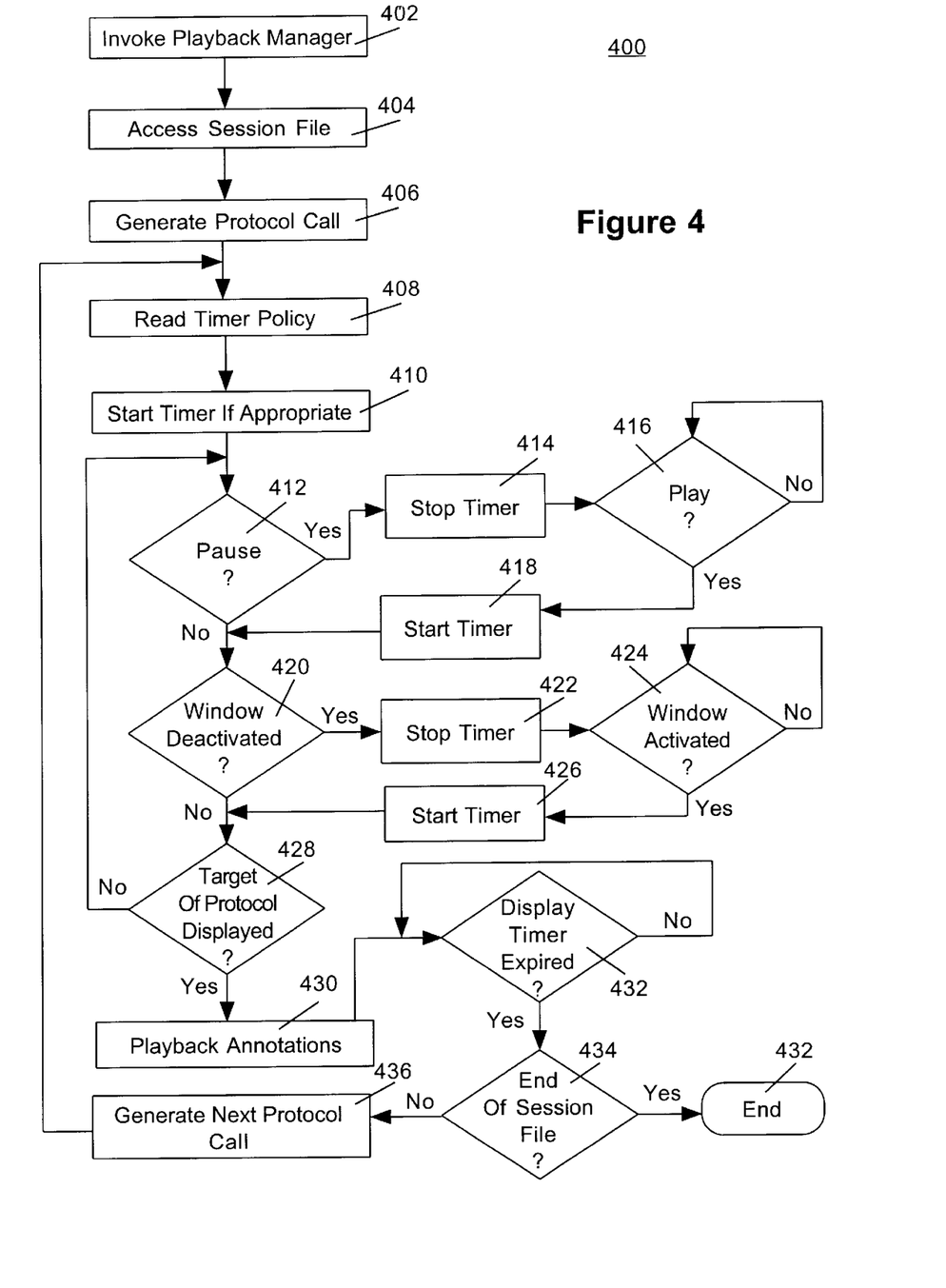
FIG. 4 is a flowchart showing the operation of the web browsing session playback process.

Referring to FIG. 4, a process 400 for playing back a browsing session is described.

In a step 402 a playback plug-in, alternatively called a playback manager, is invoked.

In a step 404, the playback plug-in accesses the contents of session file 170, and in a step 406 generates a protocol call. In a step 408 the display timer start policy for the current protocol call is read from session file 170. The timer start policy tells the playback plug-in when the timer should begin counting, e.g., when the protocol call is made or when the target of the call is received and displayed. In a step 410 the display timer is started if appropriate under the current timer start policy.

In a step 412, a determination is made as to whether the user has entered a pause command. If a pause command has been entered then in a step 414 the display timer is stopped. In a step 416 a determination is made as to whether the user has entered a play command. If the play command has not been entered the playback plug-in waits for the play command until it is received or the program is terminated. If the play command is entered by the user, then in a step 418, the display timer is re-enabled in accordance with the active timer policy.

In a step 420 a determination is made as whether the window has been deactivated. If the window has been deactivated then in a step 422, the display timer is stopped. In a step 424 a determination is made as to whether the window has been activated. If the window has not been activated the playback plug-in waits for the window to be activated or the program to be terminated. If the window has been activated, then in a step 426, the display timer is re-enabled in accordance with the active timer policy.

In a step 428 a determination is made as to whether the target of the protocol call has been displayed. If the target of the protocol call has not been displayed, then control returns to step 412. If the target of the protocol call has been displayed, then in a step 430, the annotations are played back. During playback, visually perceivable material such as text, graphics, and video, appears in a window on a display device. Typical display devices used in conjunction with computers include CRT monitors, television displays, and liquid crystal displays. Any device or mechanism suitable for communicating visually perceivable information to one or more users can be used as the display device. Audio information is typically played back through audio speakers. Playback of annotation material which causes one or more additional browser programs to run is useful for sharing a web browsing session in which side by side comparisons of web pages, or any html files, or other objects, can be made.

In a step 432 a determination is made as to whether the display timer has expired. If the display timer has not expired then the playback plug-in waits for the timer to expire or the program to terminate. If the display timer has expired, then in a step 434, a determination is made as to whether the end of session file 170 has been reached. If the end of session file 170 has not been reached, then in a step 436, the next protocol call specified by session file 170 is generated, and control returns to step 408. If the end of session file 170 has been reached then in a step 438 process 400 ends.

Security Application

The functionality of the present invention can also be used to implement a security or monitoring feature. To be used in this way, a non-user-editable version of the recorded session file is created on a server. In this way the actual use of the web browser can be studied and profiles of user access created.

Conclusion

The present invention provides a mechanism for recording, editing, annotating, communicating and replaying a browsing session. A typical implementation of the present invention is a software program that can be launched during a web browsing session.

An advantage of the present invention is that a browsing experience can be shared by one or more other people separated from the original browsing session in time, space or both. The browsing experience may result from an Internet or an intranet web browsing session.

Other advantageous features of the present invention are the ability to store the amount of time that a web page was viewed and to have it appear, in playback, for the same amount of time; the ability to annotate with text, voice, or other media, personal comments of the person capturing the session.

It will be understood by those skilled in the art that the present invention, may be implemented as software executed by any suitable information handling system such as a general purpose computer, or a limited purpose network appliance device. It will be further understood by those skilled in the art that the information processing steps described herein can be also be implemented entirely by hardware.

Additionally, it will be understood by those skilled in the art that many variations of the illustrative embodiments are possible within the scope of the present invention are possible. For example, playback of the annotation material can actually begin prior to the reception of the material which is the target of a given protocol call. Similarly, since it is common for a web page display to be larger than many display devices can accommodate, it is useful to record scrolling of the web page display to share the complete web browsing experience. It is also possible to include information in the session file which is needed to communicate window setup parameters for the playback browser and plug-ins.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The program code encoded in tangible media creates the means for causing the computer to perform the various steps of the present inventiion. The present invention can also be embodied in the form of computer program code, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code combines with the microprocessor to provide a unique device that operates analogously to specific logic circuits.

It will be understood that various other changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of recording and modifying, a web browsing session, comprising:
 a) logging one or more protocol calls generated during the web browsing session;
 b) storing the logged protocol calls in a first file according to a first format;
 c) associating a time stamp with at least one of the protocol calls;
 d) determining at least one display time, merging the at least one display time and the at least one logged protocol call to create a record having a second format and storing the record in a session file;
 e) setting a flag if the protocol call returns an error condition;
 f) reading at least one record from the session file;
 g) presenting the at least one session file record to a user;
 h) modifying the at least one session file record, if a user modification request has been received; and
 i) writing the modified record back to the session file.

2. The method of claim 1, further comprising the step of inserting annotation material into the session file.

3. The method of claim 1, further comprising the steps of inserting at least one block of annotation material into the session file, wherein each block of annotation material is associated with one protocol call.

4. The method of claim 1, further comprising the step of receiving information specified by at least one of the protocol calls.

5. The method of claim 1, further comprising the steps of:
 storing one or more files, wherein the files are received in response to the one or more protocol calls; and
 creating a list of the one or more files and including information in the list of one or more files, relating each of the one or more files to the protocol call which caused the one or more files to be downloaded.

6. A method of sharing a browsing session, the method comprising the steps of:
 a) issuing at least one protocol call;
 b) storing a list of at least one protocol call;
 c) setting a flag if the protocol call returns an error condition;
 d) creating a session file; and
 e) providing the session file to a user.

7. The method of claim 6, further comprising the step of storing a time stamp with each entry in the list of protocol calls.

8. The method of claim 7, wherein the time stamp represents the approximate time that the protocol call was issued.

9. The method of claim 7, further comprising the steps of:
 comparing a user selected threshold to a value indicative of the amount of the requested page that has been received; and
 setting the time stamp to be substantially equal to the time when the amount of the requested page received is approximately equal to the user selected threshold.

10. The method of claim 7, wherein the time stamp represents the approximate time that a requested page is fully received.

11. The method of claim 6, further comprising the steps of applying filter functions to the received files and generating filter flags indicative of the filter function output.

12. The method of claim 7, further comprising the steps of:
   determining an amount of time that a web page was displayed during the browsing session; and
   entering that amount in the session file.

13. The method of claim 12, wherein the step of determining the amount of time comprises the steps of:
   obtaining the time stamp of a first entry in the list of protocol calls;
   obtaining the time stamp of a next sequential entry in the list of protocol calls; and
   determining the difference between the time stamp of the first entry and the time stamp of the next sequential entry.

14. The method of claim 6, further comprising the step of annotating the session file.

15. The method of claim 14, wherein the step of annotating comprises the step of inserting information into the session file.

16. The method of claim 14, wherein the step of annotating comprises the step of inserting into the session file a pointer to information.

17. The method of claim 15, wherein the inserted information comprises instructions to run two or more browsers concurrently during playback.

18. The method of claim 15, wherein the inserted information comprises audio data.

19. The method of claim 15, wherein the inserted information comprises video data.

20. The method of claim 15, wherein the inserted information comprises graphics data.

21. A computer readable storage medium encoded with computer readable program code, comprising
   a) a means for causing a computer to issue at least one protocol call;
   b) a means for causing the computer to store a list of at least one protocol call;
   c) a means for setting a flag if the protocol call returns an error condition;
   d) a means for causing the computer to create a session file; and
   e) a means for causing the computer to provide the session file to a user.

22. The computer readable storage medium of claim 21, further comprising a means to cause the computer to store a time stamp with each entry in the list of protocol calls.

23. The computer readable storage medium of claim 21, further comprising:
   a means to cause the computer to compare a user selected threshold to a value indicative of an amount of the requested page that has been received; and
   a means to cause the computer to set the time stamp to be substantially equal to the time at which the amount of the requested page received is approximately equal to the user selected threshold.

24. The computer readable storage medium of claim 21, further comprising a means to cause the computer to determine an amount of time that a requested page was displayed and to enter that amount in the session file.

25. The computer readable storage medium of claim 21, further comprising a means to cause the computer to annotate the session file.

26. A method of sharing a web browsing session, comprising:
   a) accessing records of a session file, having a finite number of records;
   b) generating a protocol call;
   d) starting a timer;
   e) determining if a pause command has been received;
   f) stopping the timer if a pause has been specified;
   g) restarting the stopped timer if a play command is received;
   h) displaying, in a window, data associated with the protocol call;
   i) displaying annotation data associated with the data associated with the protocol call;
   j) determining if the timer has expired;
   k) if the timer has expired, determining if all the session file records have been accessed; and
   l) if all the session file records have not been accessed, repeating actions (a)–(l).

27. The method of claim 26, further comprising:
   prior to starting the timer, reading a timer policy and determining from the timer policy a set of conditions, if any, for starting the timer.

28. The method of claim 26, further comprising:
   subsequent to starting the timer, determining if the window has been deactivated, stopping the timer if the window has been deactivated, and restarting the stopped timer if the window is reactivated.

29. The method of claim 26, wherein expiration of the timer is determinative of a length of time that the data associated with the protocol call is to be displayed.

30. The method of claim 26, wherein the timer policy specifies that the timer is to be started when the data associated with the protocol call is completely displayed.

31. The method of claim 26, wherein the timer policy specifies that the timer is to be started when the data associated with the protocol call is partially displayed.

32. A computer readable storage medium encoded with computer readable program code, comprising:
   a) means for causing a computer to access records of a session file, having a finite number of records;
   b) means for causing a computer to generate a protocol call;
   d) means for causing a computer to start a timer;
   e) means for causing a computer to determine if a pause command has been received;
   f) means for causing a computer to stop the timer if a pause has been specified;
   g) means for causing a computer to restart the stopped timer if a play command is received;
   h) means for causing a computer to display, in a window, data associated with the protocol call;
   i) means for causing a computer to display annotation data associated with the data associated with the protocol call;
   j) means for causing a computer to determine if the timer has expired;
   k) means for causing a computer to, if the timer has expired, determine if all the session file records have been accessed; and
   l) means for causing a computer to, if all the session file records have not been accessed, repeat actions (a)–(l).

33. A method of sharing a browsing session in an active window, comprising:
   a) accessing records of a session file, having a finite number of records;
   b) generating a protocol call;

d) starting a timer;

e) determining if the window has been deactivated;

f) stopping the timer if the window has been deactivated;

g) restarting the stopped timer if the window is reactivated h) displaying, in the window, data associated with the protocol call;

i) displaying annotation data associated with the data associated with the protocol call;

j) determining if the timer has expired;

k) if the timer has expired, determining if all the session file records have been accessed; and l) if all the session file records have not been accessed, repeating actions (a)–(l).

34. A computer readable storage medium encoded with computer readable program code, comprising:

a) means for causing a computer to access records of a session file, having a finite number of records;

b) means for causing a computer to generate a protocol call;

d) means for causing a computer to start a timer;

e) means for causing a computer to determine if the window has been deactivated;

f) means for causing a computer to stop the timer if the window has been deactivated;

g) means for causing a computer to restart the stopped timer if the window is reactivated h) means for causing a computer to display, in the window, data associated with the protocol call;

i) means for causing a computer to display annotation data associated with the data associated with the protocol call;

j) means for causing a computer to determine if the timer has expired;

k) means for causing a computer to, if the timer has expired, determine if all the session file records have been accessed; and l) means for causing a computer to, if all the session file records have not been accessed, repeat actions (a)–(l).

* * * * *